(12) United States Patent
Perahia et al.

(10) Patent No.: US 6,188,896 B1
(45) Date of Patent: Feb. 13, 2001

(54) CELLULAR SATELLITE COMMUNICATION SYSTEM AND METHOD FOR CONTROLLING ANTENNA GAIN PATTERN THEREIN

(75) Inventors: Eldad Perahia, Hermosa Beach, CA (US); Donald C. Wilcoxson, Fort Wayne, IN (US)

(73) Assignee: TRW Inc., Redondo Beach, CA (US)

( * ) Notice: Under 35 U.S.C. 154(b), the term of this patent shall be extended for 0 days.

(21) Appl. No.: 09/255,175

(22) Filed: Feb. 22, 1999

(51) Int. Cl.$^7$ .................................................. H04B 7/185
(52) U.S. Cl. .............................. 455/428; 455/429; 455/63
(58) Field of Search .................................. 455/12.1, 13.1, 455/427, 428, 429, 430, 62, 63, 67.1

(56) References Cited

U.S. PATENT DOCUMENTS

| | | |
|---|---|---|
| 5,134,423 | 7/1992 | Haupt . |
| 5,402,137 | 3/1995 | Ramanujam et al. . |
| 5,546,097 | 8/1996 | Ramanujam et al. . |
| 5,875,180 * | 2/1999 | Wiedeman et al. .................... 455/63 |
| 5,894,590 * | 4/1999 | Vott et al. ............................. 457/428 |

* cited by examiner

Primary Examiner—Thanh Cong Le
(74) Attorney, Agent, or Firm—Michael S. Yatsko

(57) ABSTRACT

A satellite-based telecommunication system is provided which communicates with earth-based users located within a predetermined communications area. The communications areas have an associated interference pattern. A satellite antenna is controlled to form an antenna gain pattern distributed across the communications area. The antenna gain pattern represents the gain at any given point within the communications area. The interference pattern corresponds to the amount of interference associated with each point within the communications area. A method and apparatus are provided for controlling the gain defined by a transmitter and/or receiver of a satellite. The transmitter/receiver produces a desired antenna gain pattern. The preferred embodiment includes determining an interference pattern associated with a communications area of interest. Once the interference pattern is identified, a desired antenna gain pattern is then identified. It is preferable that the antenna gain pattern conform to the interference pattern for the communications area.

15 Claims, 9 Drawing Sheets

—— Common Reflector 20
·········· Constant C/I in cell 22
— — — Constant BER in cell 24

— Requirement
— Constant C/I in cell

CELLULAR SATELLITE COMMUNICATION SYSTEM AND METHOD FOR CONTROLLING ANTENNA GAIN PATTERN THEREIN

BACKGROUND OF THE INVENTION

In the last few years, the number of commercial cellular communications systems (of which cellular telephony is but one example) has risen dramatically. Increased use of cellular systems among consumers has given rise to a demand for higher capacity systems. In the increasingly competitive enterprise that cellular telephony has become, higher capacity systems necessitate more efficient and more cost effective systems. One of the overall limiting factors in the implementation of a cellular system is the bandwidth allocated to the system. In general, an increase in available or usable bandwidth allows a system to service a larger number of users or to provide those users with higher quality service. In the last few years, the actual bandwidth allocated to cellular telephony has remained nearly constant. Consequently, the cost of obtaining band width has risen dramatically. Thus, efficient methods of utilizing existing bandwidth are essential to increasing the capacity of cellular systems and thereby maintaining commercial viability.

In cellular communications systems, the geographic area of service of the system on the surface of the earth is generally divided into an interlocking hexagonal grid. Each hexagonal grid element is called a cell. Cells may be geographically fixed or may be defined by spot beams from a satellite. Communications signals may be transmitted to and received from consumers within each cell through the use of orbiting satellites.

In a satellite-based cellular system, the overall RF frequency band of operation is divided into a number of unique, non-overlapping RF sub-bands. Multiple cells may use the same frequency sub-bands. When a single sub-band is used by cells that are close to one another, the system may experience mutual interference between the cells. Mutual interference between cells utilizing the same frequency sub-band is known as co-frequency interference. To reduce co-frequency interference, sub-bands are allocated in a frequency pattern such that cells having a common frequency sub-band are geographically located a predetermined minimum distance from one another. The frequency pattern by which the geographic cells are allocated may be referred to as the frequency reuse pattern. The number of sub-bands in the overall system and the accompanying frequency reuse pattern may be referred to as the frequency reuse scheme. For example, the frequency reuse scheme may segment the total system bandwidth into seven sub-bands in a 7-to-1 frequency reuse scheme.

Satellite-based cellular systems may reduce co-frequency interference by increasing the number of sub-bands at the expense of reducing the overall capacity of the system. However, it is not feasible in many instances to increase the number of subbands because the total bandwidth is limited and each sub-band must have a predetermined minimum bandwidth to support communication (in addition to the reduced capacity of the system, i.e., with a fixed number of cells, the more sub-bands there are, the less that frequency is reused throughout the entire system.) Thus, the constraint that each sub-band must have a minimum pre-defined bandwidth limits the number of sub-bands into which the total system bandwidth may be divided. The limitation on the number of sub-bands similarly limits both the available frequency reuse patterns and the distance between cells utilizing the same frequency sub-band.

Alternatively, the system may be designed around a specified level of interference between cells operating in the same frequency band. The level of co-frequency interference is generally proportional to the distance between cells using a common sub-band. Therefore, when the system sets the maximal co-frequency interference, the system must similarly set a minimal separation between cells operating in the same frequency range. Specifying the minimal separation between cells operating in the same frequency sub-band dictates the frequency reuse plan and the total number of sub-bands necessary to implement the frequency reuse plan because the size of the hexagonal cells of the cellular system is constant. Determining the total number of sub-bands also sets the bandwidth allocated to each sub-band because the total bandwidth of the system is limited.

The increasing commercial exploitation of cellular communications systems demands that increasing bandwidth be allocated to each cell to support increased user demand because the bandwidth allocated to each cell is proportional to the number of voice or data users that can be serviced simultaneously in each cell. In general, increasing the bandwidth per cell increases the number of customers that the system can service in the cell at any one time, thus increasing overall profitability. However, because the overall bandwidth of the cellular system is limited, increasing the bandwidth allocated to each sub-band must necessarily reduce the number of sub-bands into which the system can be segmented. A reduction in the number of sub-bands serves to alter the frequency reuse pattern to cause the distance between cells utilizing the same frequency sub-band to decrease which in turn increases the co-frequency interference between these cells. In order to implement a higher volume cellular system, more bandwidth must be allocated to each cell. This means fewer sub-bands and consequently greater co-frequency interference from cells utilizing the same frequency sub-band because the cells must be closer together.

A method of reducing the co-frequency interference may allow the system to allocate cells using the same sub-band at a lesser distance from one another. Reducing the distance between cells in turn may allow the system to function with fewer sub-bands at a correspondingly greater bandwidth per sub-band. Greater bandwidth per sub-band in turn allows more simultaneous users, and in turn increased profitability to the service provider.

Additionally, one of the main design constraints when designing a digital cellular communications system is the bit error rate (BER). The BER generally represents the rate at which errors occur in a digital data stream between a transmitter and receiver. In digital data streams, a bit error occurs when the transmitter transmits one digital value, but the receiver outputs a different digital value to the user. The bit error rate is dependent upon the quality of the connection between the transmitter and receiver. The quality of the connection between the transmitter and receiver is affected by the amount of noise or interference in the environment through which the digital data stream travels.

Satellite-based cellular systems may compensate for noise or interference by modifying the gain pattern of an antenna on the satellite which transmits or receives the digital data stream. On the receiver side, the antenna gain represents the sensitivity of the antenna to the incoming signal. On the transmission side, the antenna gain is proportional to the power level at which outgoing signals are transmitted during transmission. Cellular systems are generally designed to service users anywhere in a given cell, providing a predetermined maximum BER (termed required design BER). If at any point in the ground cell the system is not able to maintain the predetermined maximum BER, communications with the user at that point will be noticeably impacted. Thus, the antenna gain (and gain pattern) for an entire cell must be sufficient to support a minimum signal level regardless of the noise or interference experienced by of the user in the cell.

In satellite-based cellular systems the quality of the connection between transmitters and receivers may be expressed in terms of a ratio between the desired signal or carrier level and the noise plus interference level. The ratio between carrier strength and the noise plus interference level may be described as C/(N+I). In many instances, co-frequency interference may dominate the noise plus interference term, thereby allowing the above expression to be approximated as C/I. However, in many systems background noise is a significant factor and hence the ratio C/(N+I) is generally of interest. The ratio C/(N+I) is important in the design of a cellular system because it is indicative of system performance. A high C/(N+I) ratio yields an improved BER since the bit error rate (BER) is determined by the carrier to noise plus interference ratio C/(N+I). Consequently, a cellular system having a high C/(N+I) ratio will have a low BER and vice-versa.

In the past, cellular systems have been proposed which select a level of performance by choosing a maximum BER for users in the overall system. Thus, conventional systems impose a uniform level of performance across an entire geographic cell. In conventional satellite-based communications systems, the minimum performance of the system (and thus the largest acceptable BER) is based on the location in the cell having the lowest C/(N+I) ratio.

In other words, past satellite-based cellular systems provide a minimum antenna gain at the point in a cell having the lowest C/(N+I) ratio that is sufficient to ensure a BER less than the maximum predetermined BER. In past antenna designs, the minimum antenna gain at the cell point of lowest C/(N+I) ratio represented an antenna gain level far below the maximum antenna gain for the antenna. Generally, conventional antennas provide an antenna gain pattern across a cell, wherein the pattern has a peak gain level at the center of the cell and minimum gain levels at the boundaries of the cell. The minimum signal (or carrier) level at the cell boundary must exceed the noise plus interference level by a desired amount to achieve a predetermined BER. Thus, in past antennas, when the carrier level at the cell boundary is boosted to just exceed the noise plus interference level, the carrier level at the center of the cell greatly exceeds the noise plus interference level. Consequently, a large amount of power is wasted in providing service to users at the center of cells.

In the past, antennas for cellular satellite systems have been designed to afford minimum gain at the boundary of a geographic cell to assure a satisfactory signal level. Past antennas have also been designed to reduce sidelobes to a desired level to reduce interference. In a conventional cellular satellite system, the antenna gain pattern is known for an entire spot beam which thereby determines the C/(N+I) at any location throughout the system. However, in conventional antennas, the antenna gain pattern does not afford a constant C/(N+I) over the cell. Instead, the carrier to noise plus interference C/(N+I) ratio at the center of the cell is much larger than at the boundaries of the cell. When the antenna provides a C/(N+I) ratio that is not constant over the entire cell, resources such as power are wasted because achieving a higher C/(N+I) ratio than the minimum required ratio typically does not add any value to the system.

Conventional antennas may include phased arrays, reflector-based antennas and the like. An antenna gain pattern is determined by controlling the phase and amplitude of signals transmitted from, and received by, a phased array. In antennas based on reflectors, the antenna gain pattern is determined by the size and contour of the reflector and the antenna feed design.

An example of a reflector-based antenna is disclosed in U.S. Pat. No. 5,134,423 issued to Haupt ("Low Sidelobe Resistive Reflector Antenna"). The Haupt patent discloses an antenna with a shaped reflector having a parabolic dish antenna composed of a dielectric upon the surface of a shaped reflector. A metallic coating has been deposited on the surface of the shaped reflector. The thickness of the tapered metallic coating on the surface of the dish is varied according to the radius of the dish to achieve electromagnetic tapering. When the tapered metallic coating is applied, it provides low resistivity at greater thickness and progressively higher resistivity as less metal is deposited. The metallic surface may be composed, for example, of conductors such as aluminum, copper, steel, iron, gold, and silver and may be deposited onto the surface of the dish through deposition techniques such as sputtering, evaporation, electrodeposition, and spray painting.

A need remains for an improved antenna gain control method and apparatus. It is an object of the present invention to meet this need.

SUMMARY OF THE INVENTION

It is an object of the present invention to provide an antenna gain pattern shaped to conform to an interference pattern and noise within a cell of a satellite-based telecommunication system.

It is another object of the present invention to provide an antenna gain pattern in which a main lobe is shaped such that a minimum carrier to noise plus interference ratio within each cell of a satellite-based telecommunication system is increased (over conventional antennas) at cell boundaries.

It is a corollary object of the present invention to provide an antenna gain pattern for a satellite-based telecommunication system which avoids excessive carrier signal strength at a center of cells within the system.

It is a further object of the present invention to control an antenna gain pattern to reduce the frequency reuse distance needed to prevent interference between cells utilizing a common frequency sub-band.

It is a corollary object of the present invention to control an antenna gain pattern to increase data transmission rates and reduce channel coding overhead.

It is a further object of the present invention to provide an antenna gain control method which increases the capacity and throughput of the telecommunication satellite.

These and other objects are achieved by a satellite-based telecommunication system which communicates with users located within a predetermined communications area, such as a geographically fixed cells. The communications areas have an associated interference pattern. The interference pattern corresponds to the amount of interference associated with each point within the communications area. The satellite-based communications system includes one satellite having an antenna for receiving and/or transmitting communications signals to and from the earth-based users. The antenna is designed or dynamically controlled to provide a predetermined antenna gain pattern across the communications area. The antenna gain pattern represents the transmit/receive gain at any given point within the communications area.

According to a preferred embodiment of the present invention, a method and apparatus are provided for controlling the gain defined by a transmitter and/or receiver of a satellite within the satellite-based telecommunication system. The transmitter/receiver produces a desired antenna gain pattern associated with at least one communications area, such as a fixed or mobile geographic cell defined by the satellite-based telecommunication system. The preferred embodiment includes determining an interference pattern associated with a communications area of interest. Once the interference pattern is identified, a desired antenna gain pattern is then identified. It is preferable that the antenna gain pattern conform to the interference pattern and noise for the communications area. Once an antenna gain pattern has been identified, the transmitter and/or receiver are controlled to provide the desired antenna gain pattern for the communications area. The preferred embodiment of the present invention may be carried out by a processor upon the satellite, or by a processor within a ground station which in turn controls an adaptive phased array functioning as the satellite's transmitter and/or receiver. Alternatively, a desired antenna gain pattern may be provided by constructing a reflector in a antenna to have a desired surface contour which produces a predetermined gain pattern when in operation.

DESCRIPTION OF THE PREFERRED EMBODIMENTS

In a cellular communications system, a primary performance measure of the system is C/(N+I) which is the ratio between the desired signal or carrier level and the noise plus interference level. In systems which are interference limited, C/I, the ratio of the carrier level to the interference level becomes a good approximation of this ratio. However, in typical systems in which background noise is significant (although perhaps not dominant), an antenna design which provides constant C/I over the entire cell will not necessarily provide the optimal performance with regard to the system parameter of C/(N+I).

A system design requirement of interest is providing a required bit error rate (BER) to all users. The required design BER is the maximum allowable BER which permits communication. Users must achieve a BER which is less than or equal to the required design BER. Based on the chosen modulation scheme, channel coding, and bandwidth, a required design BER translates to a ninmum preferable C/(N+I). As explained above, providing all users in a cell with a predetermined minimum C/(N+I) is desired in order to enhance system performance and ensure efficient use of system resources such as transmitter power.

The desired antenna mainlobe beam pattern to assure a constant C/(N+I) over the cell can be derived beginning with the standard downlink budget equation:

$$\left(\frac{C}{N}\right) = \frac{G_T \cdot P_T \cdot L_p \cdot (G/T)_{Terminal}}{k \cdot B_{RF}} \quad \text{(Eqn. 1)}$$

where: $G_T$ is satellite tansmitfing antenna gain, $P_T$ is transmitter power, $L_p$ is path losses, $(G/T)_{Terminal}$ is the terminal antenna gain over system noise temperature at the terminal (as opposed to the overall spacecraft noise temperature), k is Boltzmann's constant, and $B_{RF}$ is the equivalent noise bandwidth of the signal.

The standard downlink budget equation can then be rewritten in terms of the gain of the transmitting antenna as a function of C/I.

$$G_T = \frac{(k \cdot B_{RF})/(P_T \cdot L_p \cdot (G/T)_{Terminal})}{\left(\frac{C}{N+I}\right)^{-1} - \left(\frac{C}{I}\right)^{-1}} \quad \text{(Eqn. 2)}$$

Figure 1:
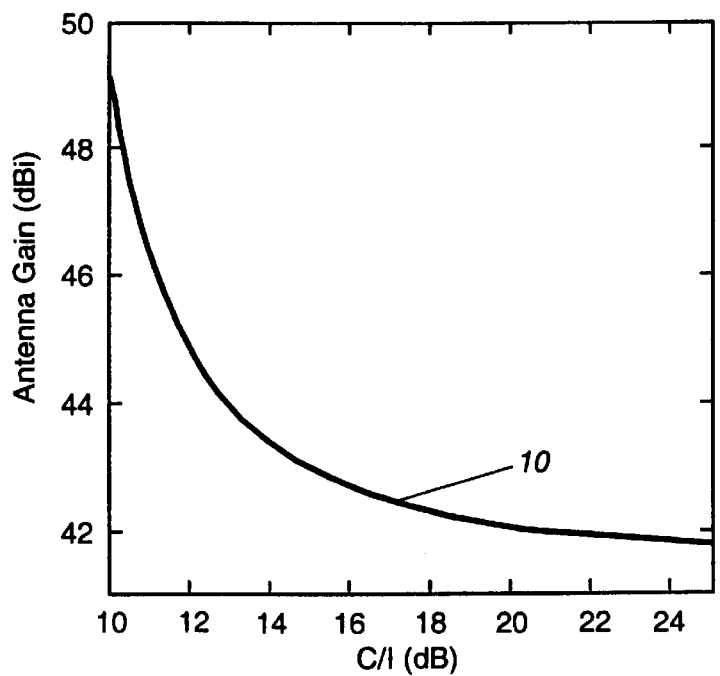
FIG. 1 illustrates an exemplary constant BER curve for a typical range of antenna gain and C/I (the ratio of carrier level to interference level) according to a preferred embodiment of the present invention.

From Equation 2, a constant BER curve, as illustrated in FIG. 1, can be found. FIG. 1 illustrates the constant BER curve 10 (constant BER=constant C/(N+I) curve) over a typical range of antenna gain and C/I operating conditions. FIG. 1 illustrates a preferred design in that if, at all locations in a ground cell (C/I varies by location), the users at those locations (specific C/I values) were provided with an antenna gain on the constant BER curve 10 in FIG. 1, all the users in the cell would achieve the same required design BER. In other words, if, at all locations in a ground cell, users were provided with an antenna gain and C/I pair on the constant BER curve 10 in FIG. 1, all users in the cell would be provided with the same required design BER. It would be desirable that all gain and C/I pairs fall on the constant BER curve 10 because gain and C/I pairs falling above and to the right of the constant BER curve 10 exceed the minimum necessary system gain and C/I and are therefore wasteful of system resources while gain and C/I pairs falling below and to the left of the constant BER curve 10 are not sufficient to provide the required design BER system design.

Because the interference level (I) in the cell is known, if the mainlobe antenna gain pattern is developed so that at each point in the cell, the antenna gain and the C/I pair at that point fall on the constant BER curve 10 in FIG. 1, then all users in the cell will be ensured a constant BER. To determine the required antenna gain pattern (mainlobe beam pattern), Equation 2 is rewritten as antenna gain as a function of interference, I. Also, here C/(N+I) is replaced with the required C/(N+I) which represents the required design BER. Also note that the C in the C/I term is rewritten as $(G/T)_{Terminal}(L_p)(P_T)(T)(G_T)$, where T is the equivalent noise temperature at the terminal. Terms are then rearranged into the following form:

$$G_T = \left[\frac{k \cdot B_{RF}}{P_T \cdot L_p \cdot (G/T)_{Terminal}} + \frac{I}{(G/T)_{Terminal} \cdot P_T \cdot L_p \cdot T_o}\right] \cdot \left(\frac{C}{N+I}\right)_{Req} \quad \text{(Eqn. 3)}$$

Equation 3 yields the desired mainlobe beam pattern that provides a constant BER (C/(N+I)) over the entire cell. Additionally, in cases in which the system is interference limited, the effect of the noise term is small and the constant BER can be approximated by a constant C/I.

Figure 2:
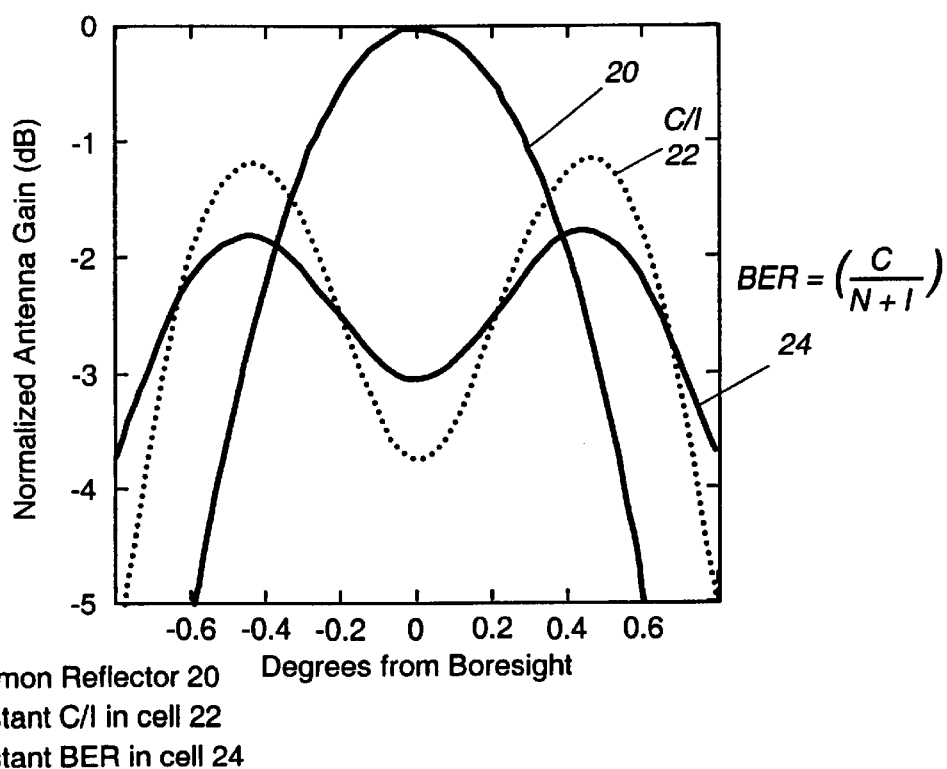
FIG. 2 illustrates the mainlobe beam patterns for a (standard) common reflector, a constant BER in the presence of noise and interference, and a constant BER in an interference-dominated system according to a preferred embodiment of the present invention.

FIG. 2 illustrates examples of mainlobe beam patterns for a (standard) common reflector mainlobe beam pattern 20, a constant BER in the presence of noise and interference (C/N+I) mainlobe beam pattern 24, and a constant BER in an interference-dominated system (C/I) mainlobe beam pattern 22. The beam patterns are shown in terms of normalized antenna gain as a function of degrees from boresight (this is a two-dimensional cut from a 3-dimensional pattern). Boresight is the exact center of the mainlobe, that is on ray from the antenna directed down to the center of the ground cell. Thus boresight is defined for each mainlobe directed towards a cell and may be different from the geometric boresight of the reflector. The boresight is directed to the center of the ground cell and, because of the vast distance from the elevated position of the satellite from the ground cell, the edges of the ground cell fall only a few tenths of degrees from boresight.

The (standard) common reflector antenna beam pattern 20 of FIG. 2 is indicative of a typical satellite antenna main lobe beam pattern in use today. Note that the typical antenna mainlobe beam pattern 20 is maximal at the center of the ground cell, indicated as 0 degrees from boresight along the x-axis of FIG. 2. The mainlobe patterns for constant BER in the presence of the noise and interference beam pattern 24 (C/N+I) and in interference dominated systems beam pattern 22 (C/I) are also shown in FIG. 2. Note that both patterns have a decreased gain at boresight which rises as the pattern moves away from boresight and then falls off. The C/(N+I) pattern may have somewhat higher normalized antenna gain at boresight than the C/I pattern, while the C/I pattern has somewhat higher normalized antenna gain at the "humps" that occur as the gain pattern moves away from boresight.

Shaped antenna mainlobe patterns 22, 24 may be implemented in a variety of manners including the use of shaped reflectors, adaptive antenna arrays, beamformers, altered or multiple feeds on a shaped or unshaped reflector and the like. Presently, one commercially viable option is the use of a shaped reflector. The shaped reflector may be composed of a parabolic dish antenna composed of a dielectric upon the surface of which a metallic coating has been deposited. The thickness of the metallic coating on the surface of the dish is varied according to the radius of the dish causing an electromagnetic taper to produce the desired mainlobe beam pattern. The metallic surface may be composed, for example, of conductors such as aluminum, copper, steel, iron, gold, and silver and may be deposited onto the surface of the dish through deposition techniques such as sputtering, evaporation, electrodeposition, and spray painting.

Figure 3:
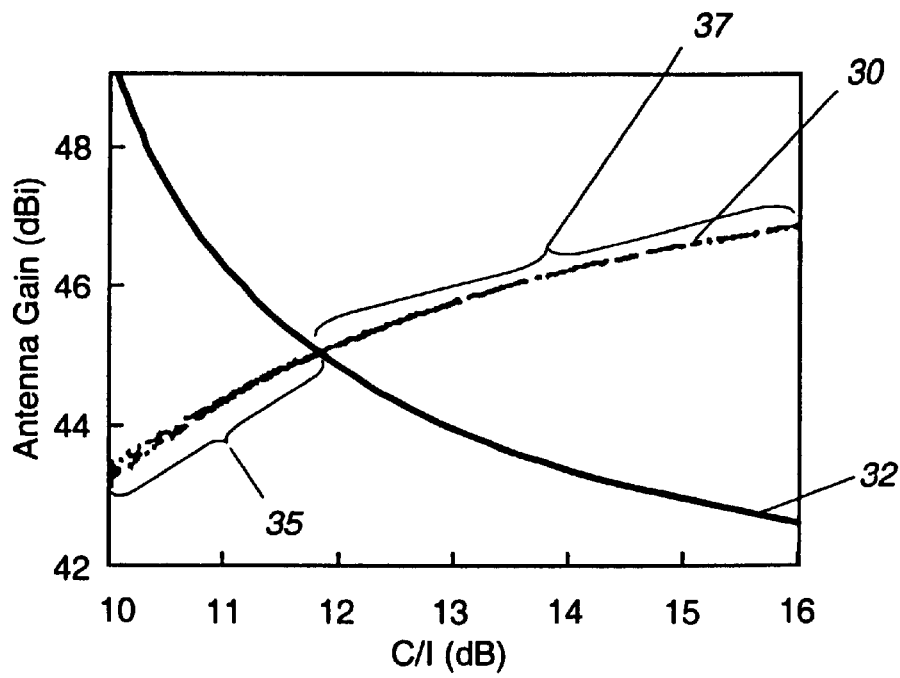
FIG. 3 illustrates an antenna gain vs. C/I performance for a (standard) common reflector with a required constant BER curve shown according to a preferred embodiment of the present invention.

FIG. 3 illustrates the antenna gain vs. C/I performance curve 30 for a typical common reflector in use today as compared to the ideal system requirement of the constant BER curve 32. The common reflector curve 30 running from the lower left of FIG. 3 to the upper right of FIG. 3 represents the actual antenna gain and C/I pair for each point in the hexagonal ground cell. Each point on the curve 30 represents a location in the ground cell. Curve segment 35 denotes the portion of curve 30 located below and to the left of the point of intersection of curve 30 with the required design BER curve 32. Curve segment 37 denotes the portion of curve 30 located above and to the right of the point of intersection of curve 30 with the required design BER curve 32. Points that fall on the curve segment 35 below and to the left of the required design BER curve 32 do not satisfy the design requirement and thus are not adequate to support communication at the required design BER. Points falling on curve segment 37 above and to the right of the required design BER curve 32 exceed the required design BER curve 32 and thus permit communication, but such locations are not efficient in terms of power; i.e., at such locations, the carrier level is much higher than it needs to be to meet the required design BER requirements.

For the common reflector system shown in FIG. 3 to be operable at all points within the hexagonal ground cell, additional steps must be taken to raise each point 35 above the required BER curve 32. The system performance requirements may be met by conceptually moving the curve down and to the left, such that all point are above and to the right of the curve.

Several of the elements of Equation 2 may be modified to shift the constant BER curve. For example, reducing the order of modulation reduces the required C/(N+I) which shifts the curve down and to the left; increasing the amount of channel coding also reduces the required C/(N+I); reducing the signaling rate reduces $B_{RF}$ which shifts the curve down; increasing $P_T$ also shifts the curve down; and increasing $(G/T)_{Terminal}$ also shifts the curve down. The preferred embodiment of the present invention provides a more efficient method of meeting the system requirements by moving the points themselves, without the additional strain on system resources required to shift the curve.

Figure 4:
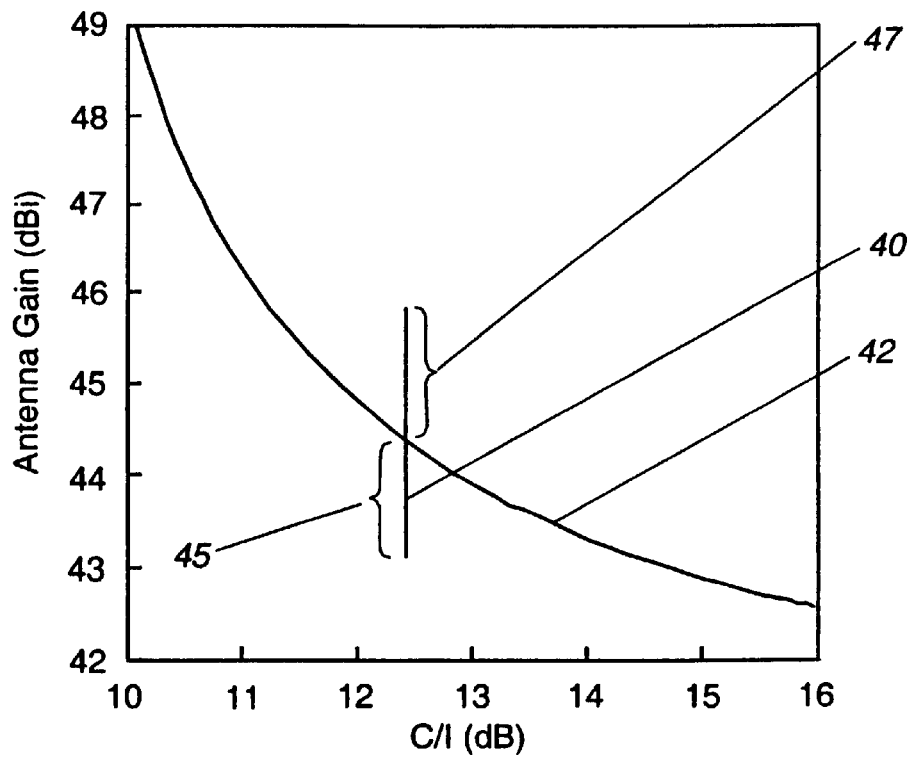
FIG. 4 illustrates an antenna gain vs. C/I performance for a constant C/I mainlobe pattern with a required constant BER curve shown according to a preferred embodiment of the present invention.

FIG. 4 illustrates the antenna gain vs. C/I performance for the constant C/I mainlobe pattern shown in FIG. 2 as implemented in a cellular system that is not interference dominated or noise dominated. Each gain and C/I pair on the performance curve 40 corresponds to a location in the ground cell. The constant BER curve 42 intersects the vertical constant C/I performance curve 40. Curve segment 45 denotes the portion of curve 40 located below and to the left of the point of intersection of curve 40 with the required design BER curve 42. Curve segment 47 denotes the portion of curve 40 located above and to the right of the point of intersection of curve 40 with the required design BER curve 42. Thus, for the given typical system characteristics ($P_t$, $L_p$, $(G/T)_{Terminal}$, $B_{RF}$, and $C/(N+I)_{Req}$) the C/I mainlobe pattern as shown in FIG. 2 may not provide adequate system response at all locations on curve segment 45 in the ground cell. However, the mainlobe pattern will exceed the design requirements in other locations on curve segment 47, meaning that the system, although allowing communication at (or better than) the required desired BER, is not as efficient as possible. In other words, at some locations in the ground cell on curve segment 47, the gain and C/I pair exceeds that required to meet the required design BER (portion of the vertical line above the required design BER curve) and is thus wasteful of system resources. At other locations in the ground cell on curve segment 45, the gain and C/I pair falls short of the required design BER (portion of the vertical line below the required design BER curve) and is thus not sufficient to support communications within system design parameters. Thus additional steps must be taken for these points to meet the required design BER for the system. This could involve reducing the order of modulation, increasing channel coding, reducing the signaling rate, increasing the transmitter power, or increasing the $(G/T)_{Terminal}$. All of these options would have a negative impact on overall system performance.

Figure 5:
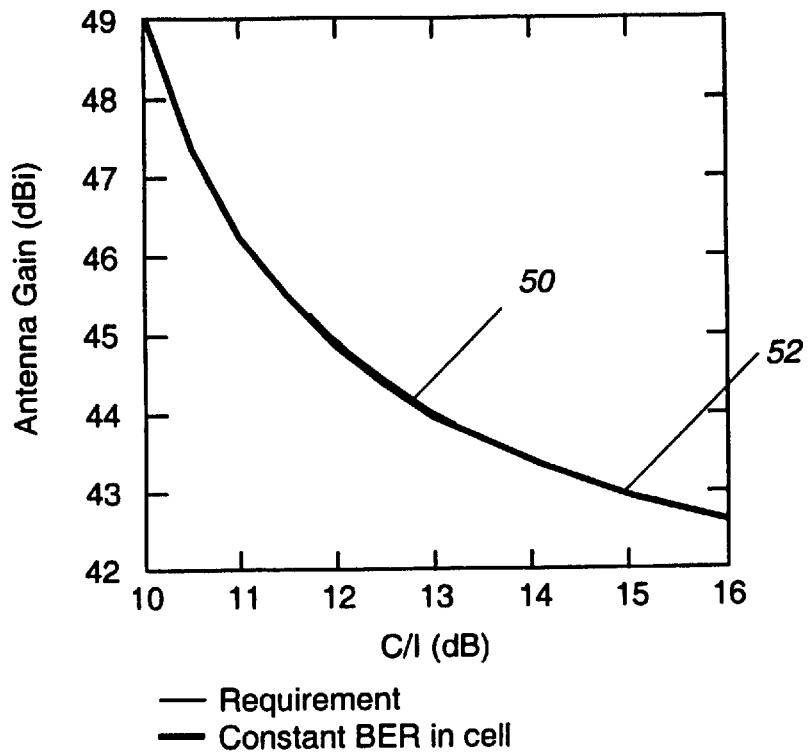
FIG. 5 illustrates an antenna gain vs. C/I performance for a constant C/(N+I) (the ratio of carrier level to noise level plus interference level) mainlobe pattern with a required constant BER curve shown according to a preferred embodiment of the present invention.

FIG. 5 illustrates the antenna gain vs. C/I performance curve 50 for the constant BER (i.e., constant C/N+I) mainlobe pattern shown in FIG. 2, using the same system parameters ($P_t$, $L_p$, $(G/T)_{Terminal}$, $B_{RF}$, and $C/(N+I)_{Req}$) as above. As in FIGS. 3 and 4, each gain and C/I pair on the performance curve 50 in FIG. 5 corresponds to a location in the ground cell. FIG. 5 shows that the gain and C/I pairs on the performance curve 50 are aligned along the constant BER curve 52, as desired. Thus, using the constant BER mainlobe pattern shown in FIG. 2 provides a system with constant, required design BER. The constant, required design BER means that no system resources are wasted nor are additional system resources necessary for all ground points in the cell to operate at least at the required design BER. Thus, the constant, required design BER solution is the most efficient solution both in terms of system weight, size, power, and capacity (thus minimizing installation costs).

Figure 6:
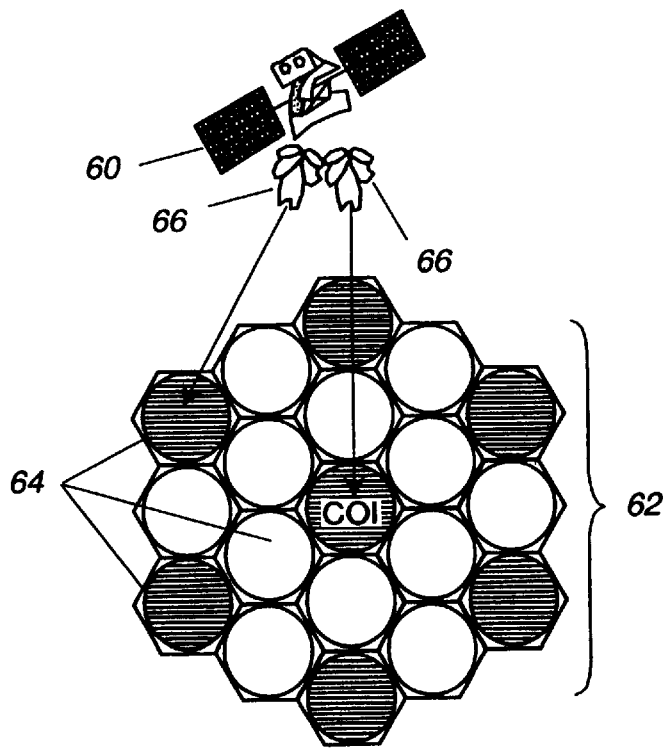
FIG. 6 illustrates a cellular system with a frequency reuse pattern of 4-to-1 according to a preferred embodiment of the present invention.

As an example, these mainlobe patterns may be implemented, as seen in FIG. 6, in a satellite-based cellular communication system utilizing 4-to-1 frequency reuse. The cellular communications satellite 60 communicates in communication area, such as ground cells 62, using a total frequency band which has been segmented into four sub-bands called a 4-to-1 frequency reuse plan. The 4-to-1 frequency reuse plan means that the highlighted cells 64 are all served by the same frequency sub-band. The other cells are serviced by frequency sub-bands other than the sub-band of the cell of interest at the center. Two antenna mainlobe patterns 66 are directed toward different co-frequency cells. The mainlobe patterns 66 satisfy the constant required design BER as shown in FIG. 2.

Figures 7A, 7B:
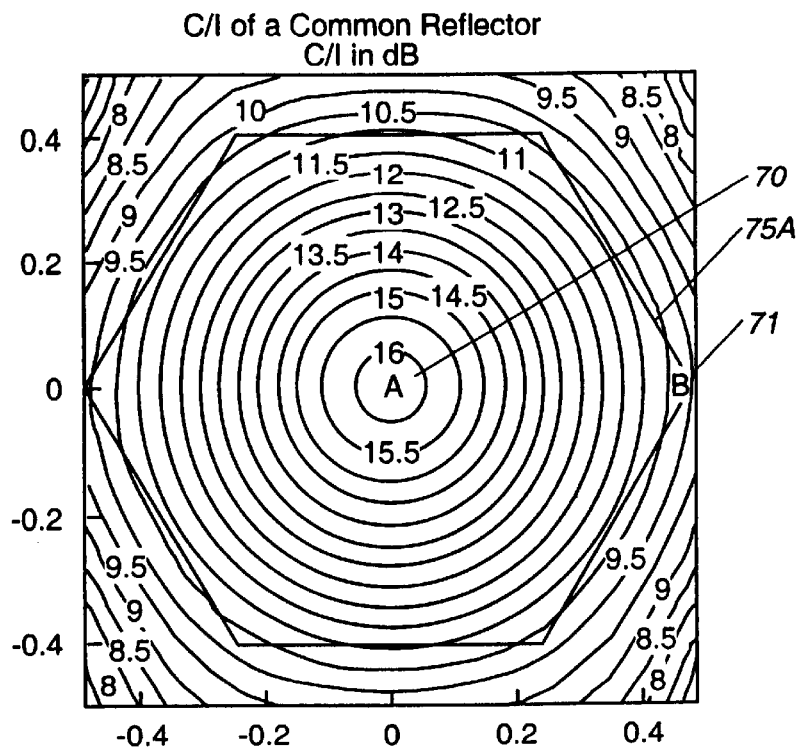
FIG. 7a illustrates the C/I for a 4:1 frequency reuse pattern of cells for a conventional common reflector as projected onto a hexagonal ground cell.
FIG. 7b illustrates the antenna gain for a conventional common reflector as projected onto a hexagonal ground cell.

FIGS. 7a and 7b illustrate the C/I and gain for a common, unshaped reflector as projected onto one of the hexagonal ground cells 75. In FIG. 7a, the varying levels of C/I in dB inside the hexagonal ground cell 75a are shown as a contour plot. The C/I level falls from a maximum of about 16 dB at point A 70 in the center of the cell 75a to a minimum of about 10 dB at point B 71 near the edge of the cell 75a. In FIG. 7b the varying levels of antenna gain in dB inside the hexagonal ground cell 75b are shown as a contour plot. In FIG. 7b the gain falls from a maximum of about 46.5 dB at point A 72 in the center of the cell 75b to a minimum of about 43.25 dB at point B 73 near the edge of the cell 75b.

Figure 7C:
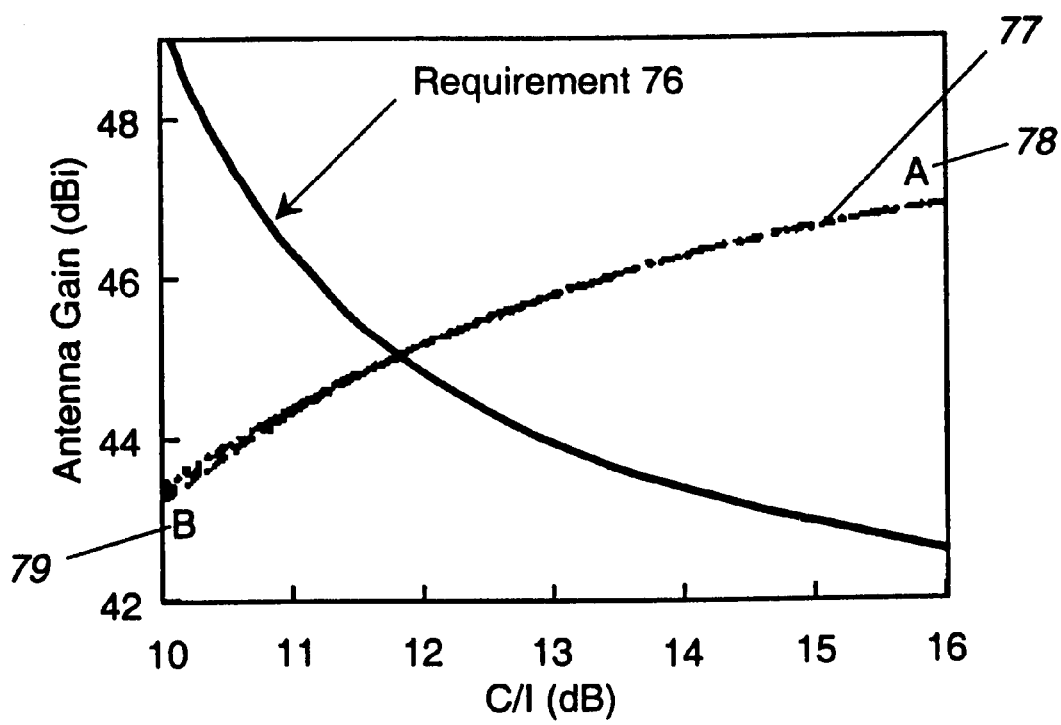
FIG. 7c illustrates the comparison between a design requirement BER curve and the points in a ground cell for a common reflector.

FIG. 7c illustrates how points A and B from FIGS. 7a and 7b compare to the required design BER. The required design BER curve 76 is shown as is the performance curve 77 representing all points within the hexagonal ground cell. Point A 78, spatially located at the center of the cell, is far above the curve and to the right. Thus, point A 78 greatly exceeds the required design BER curve 76 and will support communication at better than the required design BER, but is wasteful of system resources. Point B 79 falls below and to the left of the required design BER curve 76 and thus is not sufficient to support communication at the required design BER. Consequently, in order for the system to operate at the required design BER in this case, additional systems resources will be needed to boost point B to a point above the required design BER curve 76. This performance improvement will also serve to further increase the margin between point A 78 and the required design BER curve thus increasing its inefficiency and potentially adding to co-frequency interference.

Figure 8C:
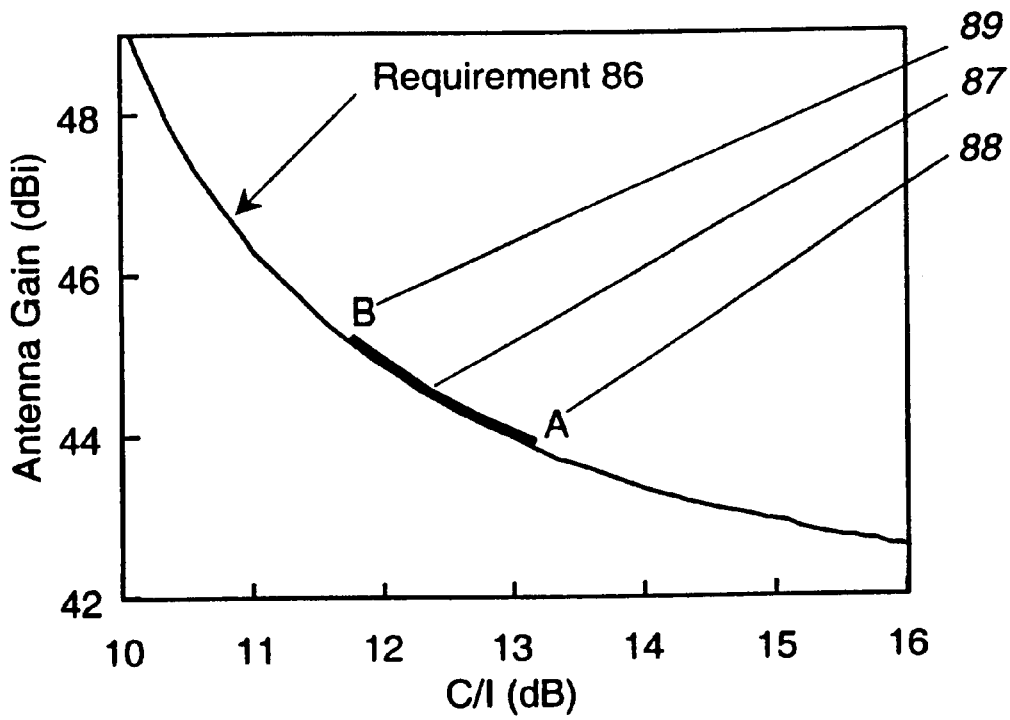
FIG. 8c illustrates a comparison between a design requirement BER curve and the points within a ground cell for a shaped reflector implementing the mainlobe pattern as shown in FIG. 2 according to a preferred embodiment of the present invention.
Figure 8A:
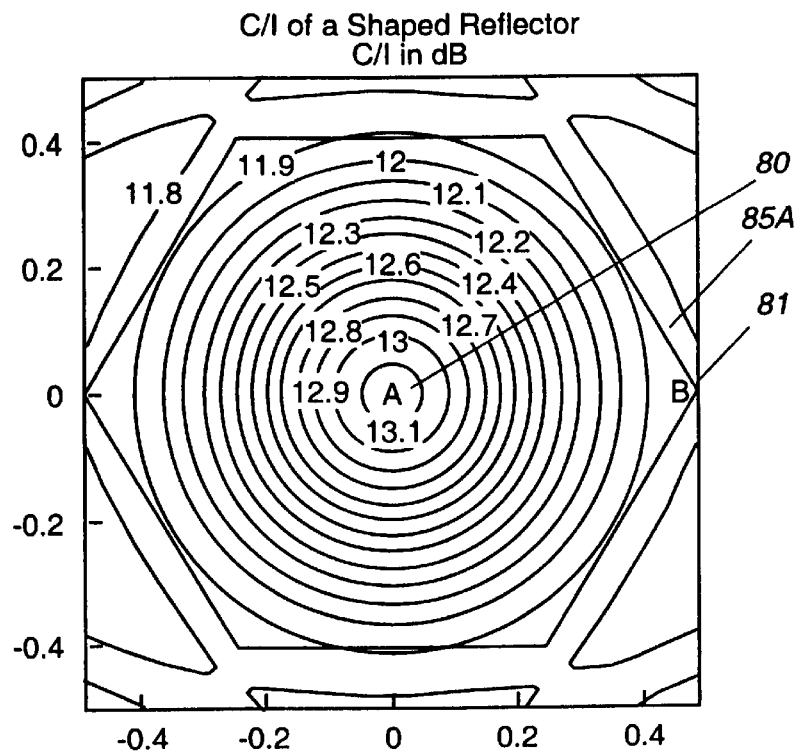
FIG. 8a illustrates the C/I for a 4:1 frequency reuse pattern of cells for a shaped reflector implementing a mainlobe pattern as shown in FIG. 2 as projected onto a ground cell according to a preferred embodiment of the present invention.
Figure 8B:
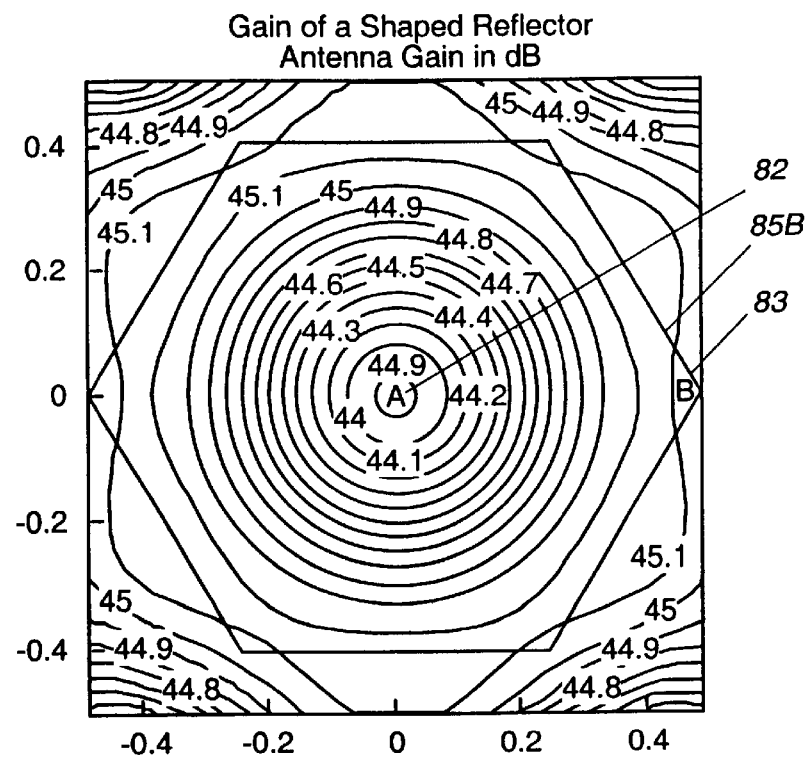
FIG. 8b illustrates the antenna gain for a shaped reflector implementing a mainlobe pattern as shown in FIG. 2 as projected onto a ground cell according to a preferred embodiment of the present invention.

FIGS. 8a and 8b illustrate the C/I and gain for the constant C/(N+I) mainlobe pattern derived above and shown in FIG. 2, projected onto one of the hexagonal ground cells 85, as might be implemented with a shaped reflector. In FIG. 8a, as in FIG. 7a, the varying levels of C/I in dB inside the hexagonal ground cell 85a are shown as a contour plot. In FIG. 8a, the C/I level falls from a maximum of about 13.1 dB at point A 80 in the center of the cell 85a to a minimum of about 11.8 dB at point B 81 near the edge of the cell 85a. In FIG. 8b, as in FIG. 7b, the varying levels of antenna gain in dB inside the hexagonal ground cell 85b are shown as a contour plot. In FIG. 8b it can be seen that the gain rises from a minimum of about 43.9 dB at point A 82 in center of the cell 85b to a maximnum of about 45.1 dB at point B 83 near the edge of the cell 85b.

As in FIG. 7c above, FIG. 8c illustrates how points A and B from FIGS. 8a and 8b compare to the design BER requirement. Again, the required design BER curve 86 is shown as is the curve 87 representing all points within the hexagonal ground cell 85. It can be seen that both points A 88 and B 89, and indeed all points within the ground cell, fall on the design BER curve 86. Thus, communications may be supported at both points A 88 and B 89 at the design BER and no additional system resources are necessary. The shaped reflector satellite system may be implemented with smaller and lighter components and at less transmitter power, all of which can provide substantial commercial benefits.

Figure 9:
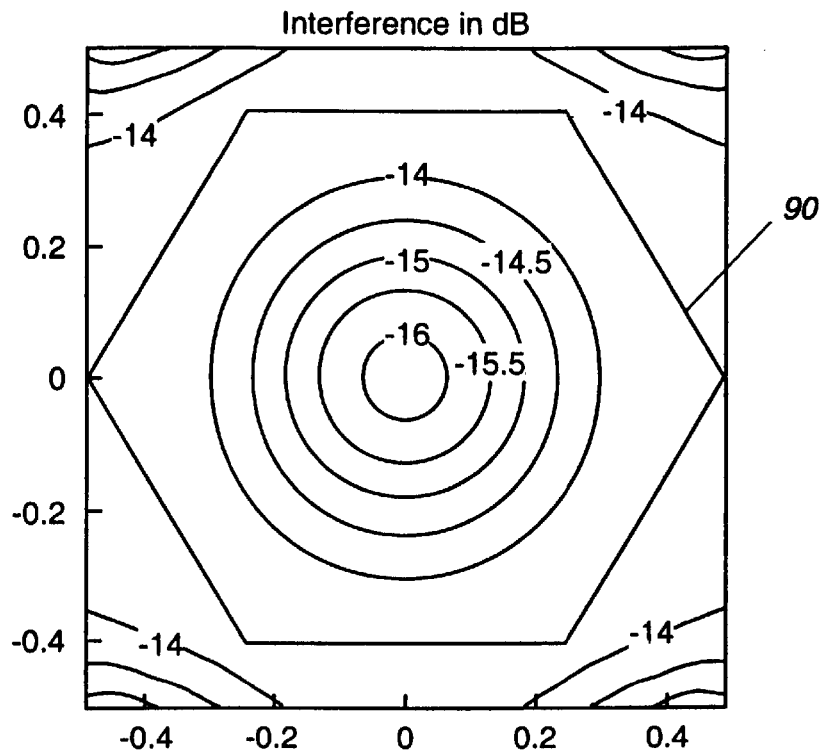
FIG. 9 illustrates a conventional interference level for a typical ground cell.

Additionally, designing a system around the constant BER curve shows remarkable advantages in cases where the interference pattern in the hexagonal ground cell is not centered around the midpoint of the cell. This can be illustrated by comparing FIG. 7b, the gain pattern of a common reflector, to FIG. 9, the typical interference pattern 90 in most hexagonal ground cells. Both the common reflector gain pattern and the interference pattern can be seen to be greatest at the midpoint of the cell and decrease towards the edges of the cell. In cases such as this, system resources would be impacted to achieve the required design BER. While such a system would not be optimally efficient it would represent commercially feasible present art.

Figure 10:
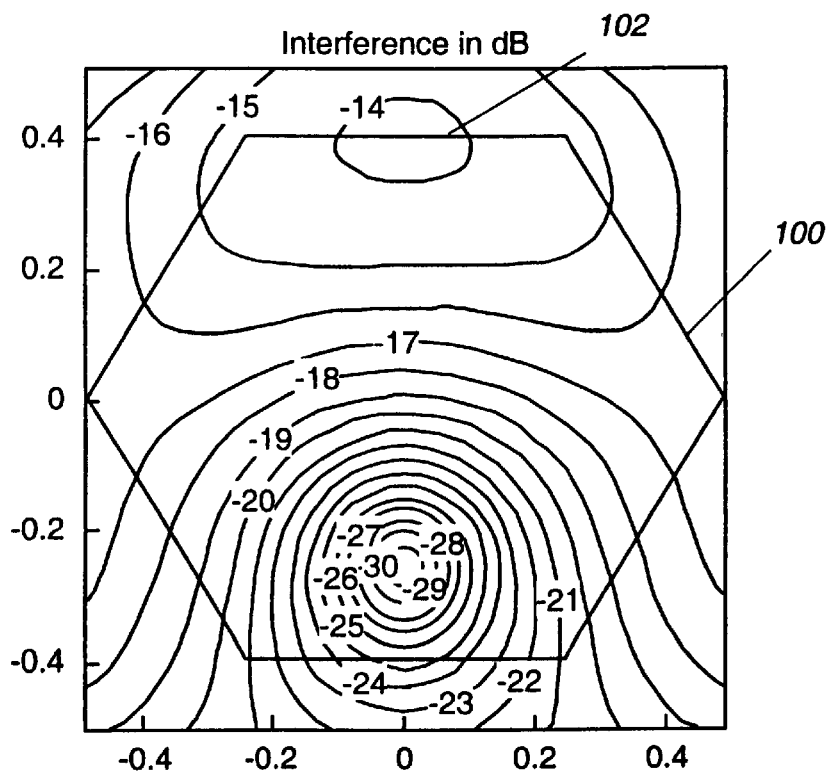
FIG. 10 illustrates a conventional interference level for a specialized ground cell.

However, in a number of situations, the interference pattern encountered in a hexagonal ground cell is not centered on the midpoint of the cell. FIG. 10 illustrates an exemplary interference pattern for a hexagonal cell 100 on the edge of a service area or in the presence of few other hexagonal cells or a cell at a large angle relative to the boresight of the satellite antenna. FIG. 10 shows that the interference pattern in the present case is vastly different from the interference pattern shown in FIG. 9. The gain pattern applied to a cell must provide sufficient gain to allow communication at a required design BER. Thus, applying a common reflector antenna gain pattern to such a cell of a satellite-based communication system is quite inefficient. This is because the location in the cell which needs to be provided with the highest gain as shown in FIG. 10 to be the upper edge of the cell 102 while, in comparison, the common reflector gain pattern exhibits its lowest gain on the edge of the cell. Thus the overall system performance would have to be greatly reduced to maintain the required design BER throughout the cell.

Figure 11:
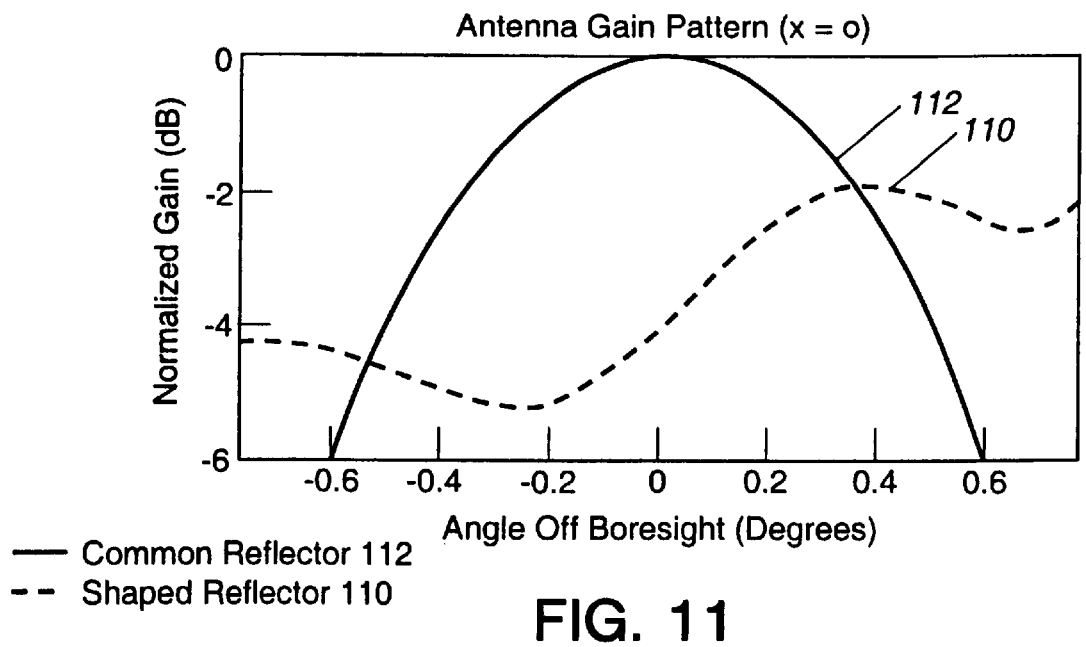
FIG. 11 illustrates an antenna gain pattern for a shaped reflector as compared to an antenna gain pattern for a common reflector according to a preferred embodiment of the present invention, where the interference level is as in FIG. 10.
Figure 12:
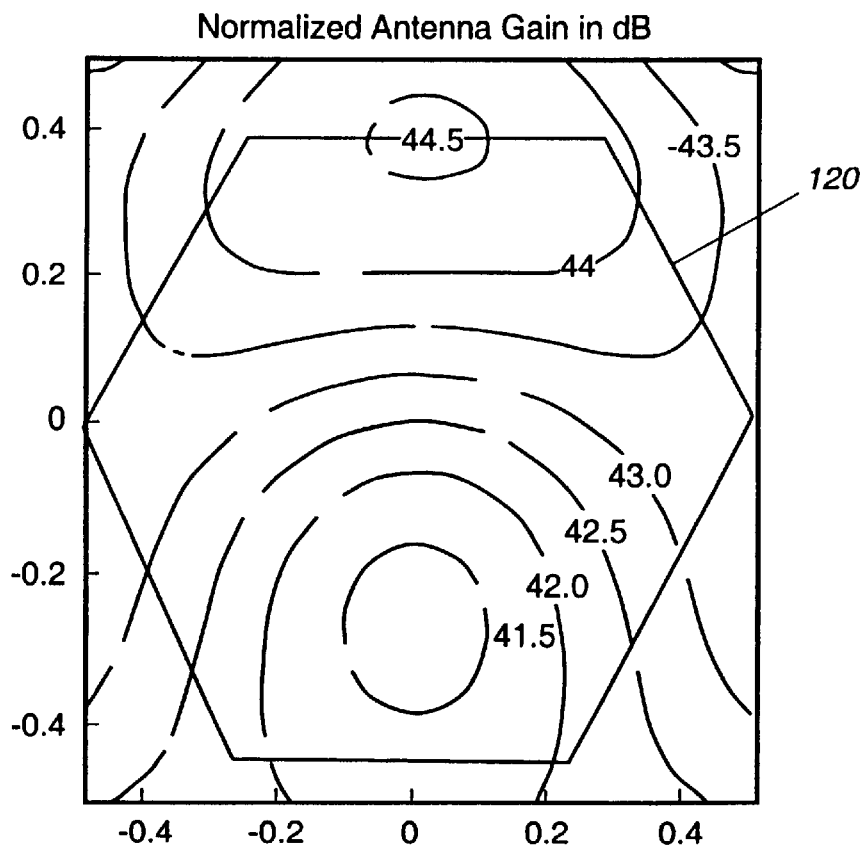
FIG. 12 illustrates an antenna gain pattern for a shaped reflector for the specialized ground cell of FIG. 10 according to a preferred embodiment of the present invention.

However, applying the present invention to match the interference pattern of the cell in FIG. 10 to the constant required design BER curve produces the antenna gain pattern for a shaped reflector as shown in FIG. 11 (shown is one cut at x=0 along the y-axis in FIG. 12.) FIG. 11 illustrates the antenna gain patterns for the common reflector 112 as compared to the new antenna gain pattern 110 to be implemented with a shaped reflector. Note that although a shaped reflector is used in this case to implement the desired antenna gain pattern, the antenna gain pattern could, of course, also be implemented by several other means besides a shaped reflector such as an adaptive antenna array or a beamformer.

The resultant antenna gain (in 3-dimensions) for the shaped reflector case is illustrated in FIG. 12. Comparing FIG. 12 to FIG. 10, the antenna gain for the shaped reflector conforms to the interference pattern of the hexagonal ground cell 120 as shown in FIG. 10. (As used herein, when reference is made to antenna gain pattern conforming to the interference pattern, it is meant that the antenna design produces a cluster of antenna gain VS C/I points having a curved line fit that has a majority of its slope between zero and minus infinity.) Thus, the required design BER can be achieved with the most efficient, and therefore least costly, power consumption, size and weight because the antenna gain of the shaped reflector conforms to the interference pattern of the ground cell 120.

Figure 13:
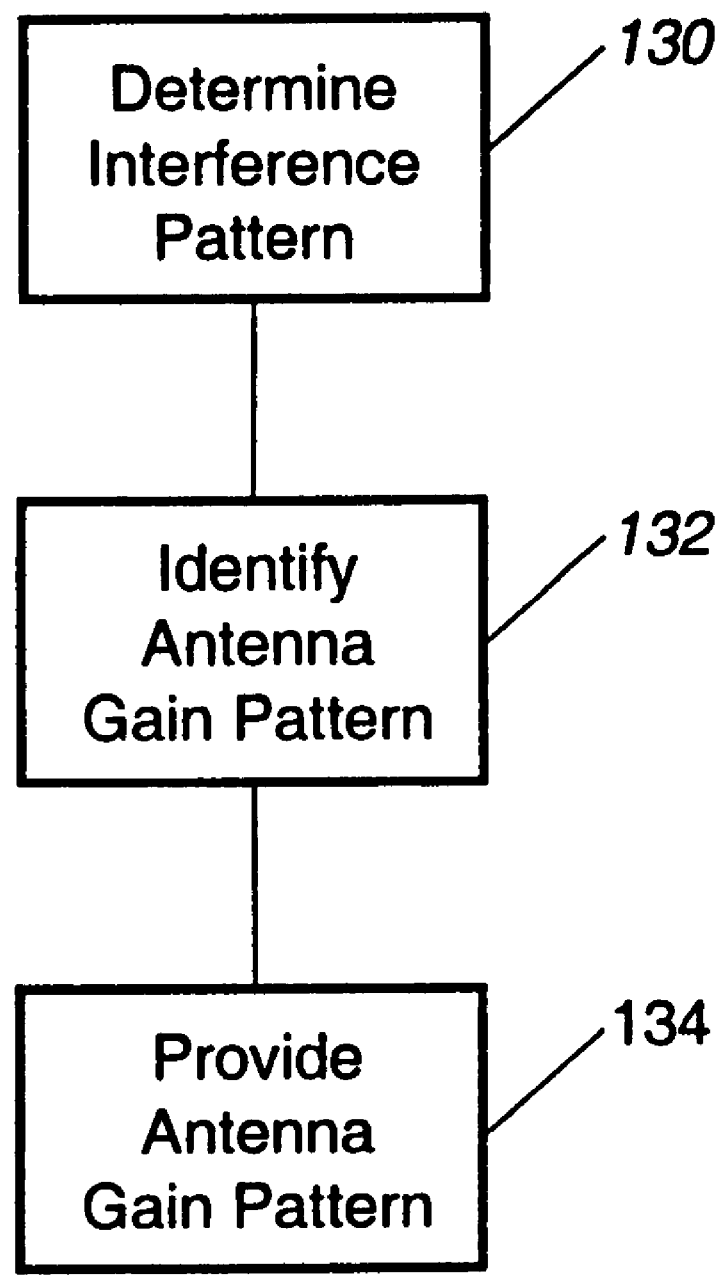
FIG. 13 illustrates a flow chart according to a preferred embodiment of the present invention for determining a desired antenna gain pattern.

FIG. 13 is a block diagram illustrating a preferred embodiment of the present invention. First, the interference pattern in the cell of interest must be determined at step 130. Second, an antenna gain pattern conforming to the interference pattern of the cell of interest must be identified at step 132. Finally, the identified antenna gain pattern must be provided by the satellite at step 134. In one embodiment of the present invention, the interference pattern for the cell of interest is predetermined, prior to satellite launch, and an antenna is constructed to deliver a conforming antenna gain pattern. The antenna may include a shaped reflector, beamformer, or adaptive array. In another embodiment, an adaptive array, beamformer, or the like are controlled dynamically on the satellite to match the antenna gain pattern to the interference pattern of the ground cell. The dynamic control is performed in real time. In general, both the mainlobe antenna gain pattern and interference patterns are designed together, possibly through an iterative process, such that the mainlobe antenna gain conforms to the interference pattern in the cell of interest.

Although the present invention has been described with reference to specific embodiments, those of skill in the art will recognize that changes may be made thereto without departing from the scope and spirit of the invention as set forth in the appended claims.

What is claimed is:

1. In a satellite-based communications system communicating with user terminals located in a communications area, the system including at least one satellite with a transceiver for communicating with the user terminals, the transceiver having an antenna for transmitting and receiving communications signals to and from the user terminals in the communications area, the communications area having an associated interference pattern defined by interference levels which vary at different positions in the communications area, the antenna defining an antenna gain pattern, a method for controlling the antenna gain pattern in the communications area, the method comprising:

determining an interference pattern associated with a communications area;

calculating an antenna gain pattern that conforms to said interference pattern determined for said communications area; and providing an antenna for at least one satellite that provides said antenna gain pattern for the communications area.

2. The method of claim 1 wherein said providing step comprises the step of providing said antenna gain pattern for the communications area in the shape of a hexagonal area of a cellular communications system.

3. The method of claim 1 wherein said determining step comprises the step of determining the noise and co-frequency interference.

4. The method of claim 1 further comprising controlling an adaptive antenna array to provide the antenna gain pattern in the communication area.

5. The method of claim 1 further comprising shaping a reflector in an antenna to provide the antenna gain pattern in the communication area.

6. The method of claim 1 wherein said calculating step comprises the step of calculating an antenna gain pattern that conforms to a required design bit error rate for the communications area.

7. A satellite-based communications system for communicating with a user terminal located in a communication area, the system including at least one satellite with a transceiver for communicating with the user terminal, the transceiver having an antenna for transmitting and receiving communications signals to and from the user terminal in the communications area, the communication area having an associated interference pattern defined by interference levels which vary at different positions in the communications area, comprising:

means for determining the interference pattern in the communications area;

means for calculating an antenna gain pattern that conforms to said interference pattern determined for said communication area; and an antenna providing said antenna gain pattern for the communication area.

8. The satellite-based communications system of claim 7 wherein the communications system is a cellular telephony system and the communication area is the hexagonal communication area of a cellular telephony system.

9. The satellite-based communications system of claim 7 wherein said antenna comprises a reflector shaped to provide the antenna gain pattern in the communication area.

10. The satellite-based communications system of claim 7 wherein said antenna comprises an adaptive antenna array controlled to provide said antenna gain pattern in the communication area.

11. The satellite-based communications system of claim 7 wherein said antenna gain pattern conforms to a required design bit error rate for the communications area.

12. A satellite-based communications system for communicating with a user terminal located in a communication area, the system including at least one satellite with a transceiver for communicating with the user terminal, the transceiver having an antenna for transmitting and receiving communications signals to and from the user terminal in the communications area, the communication area having an associated interference pattern defined by interference levels which vary at different positions in the communications area, comprising:

means for determining the interference pattern in the communications area;

means for calculating an antenna gain pattern that conforms to said interference pattern determined for said communication area; and means for providing said antenna gain pattern for said communications area.

13. The satellite-based communications system of claim 12 wherein said providing means includes a reflector shaped to provide the antenna gain pattern in the communication area.

14. The satellite-based communications system of claim 12 wherein said providing means includes an adaptive antenna array to provide the antenna gain pattern in the communication area.

15. The satellite-based communications system of claim 12 wherein the antenna gain pattern conforms to a required design bit error rate for the communications area.

* * * * *